US008984612B1

(12) United States Patent
Gat et al.

(10) Patent No.: US 8,984,612 B1
(45) Date of Patent: Mar. 17, 2015

(54) METHOD OF IDENTIFYING AN ELECTRONIC DEVICE BY BROWSER VERSIONS AND COOKIE SCHEDULING (71) Applicant: Google Inc., Mountain View, CA (US)

(72) Inventors: Yoram Gat, Tel Aviv (IL); Yaniv Shuba, Tel Aviv (IL); David Wyrobnik, Boston, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/477,351

(22) Filed: Sep. 4, 2014

(51) Int. Cl.
G06F 15/16 (2006.01)
H04L 29/08 (2006.01)
G06F 17/30 (2006.01)
H04L 29/06 (2006.01)

(52) U.S. Cl.
CPC ........ H04L 67/306 (2013.01); G06F 17/30873 (2013.01); H04L 63/083 (2013.01)
USPC .................................. 726/9; 726/4; 709/224

(58) Field of Classification Search
USPC .......................................... 726/4, 9; 709/224
See application file for complete search history.

(56) References Cited

U.S. PATENT DOCUMENTS

| 7,461,120 | B1 | 12/2008 | Artz, Jr. et al. |
| 7,657,932 | B2 * | 2/2010 | Ballinger et al. .................. 726/9 |
| 7,870,202 | B2 * | 1/2011 | Madams et al. .............. 709/206 |
| 8,229,812 | B2 * | 7/2012 | Raleigh ........................... 705/34 |
| 8,452,881 | B2 * | 5/2013 | Boubez et al. ................ 709/229 |
| 8,522,341 | B2 * | 8/2013 | Nochta et al. ................... 726/20 |
| 8,528,061 | B1 | 9/2013 | Davis |
| 8,621,636 | B2 * | 12/2013 | Bailey, Jr. ...................... 726/25 |
| 8,847,729 | B2 * | 9/2014 | Moore et al. ................ 340/5.51 |
| 2004/0110172 | A1 * | 6/2004 | Olson et al. ...................... 435/6 |
| 2009/0276771 | A1 * | 11/2009 | Nickolov et al. ............. 717/177 |
| 2009/0288155 | A1 * | 11/2009 | Joshi et al. ......................... 726/9 |
| 2010/0088364 | A1 * | 4/2010 | Carter et al. .................. 709/203 |
| 2010/0100952 | A1 * | 4/2010 | Sample et al. ..................... 726/9 |
| 2010/0169262 | A1 * | 7/2010 | Kenedy et al. .................. 706/50 |
| 2011/0055920 | A1 * | 3/2011 | Hariri ............................. 726/22 |
| 2011/0125894 | A1 * | 5/2011 | Anderson et al. ............. 709/224 |
| 2011/0162038 | A1 * | 6/2011 | Chunilal ........................... 726/1 |
| 2011/0184993 | A1 * | 7/2011 | Chawla et al. ................ 707/802 |
| 2013/0086639 | A1 * | 4/2013 | Sondhi et al. ..................... 726/4 |
| 2013/0152158 | A1 * | 6/2013 | Yoshihama ....................... 726/1 |
| 2014/0059647 | A1 * | 2/2014 | Immonen et al. ................. 726/3 |
| 2014/0082749 | A1 * | 3/2014 | Holland et al. ................. 726/29 |
| 2014/0122223 | A1 | 5/2014 | Smith et al. |
| 2014/0298419 | A1 * | 10/2014 | Boubez et al. .................... 726/4 |

* cited by examiner

Primary Examiner — Haresh N Patel
(74) Attorney, Agent, or Firm — Fox Rothschild LLP (57) ABSTRACT

A web service provider identifies electronic devices that are associated with a particular user by using device parameters, and user agents strings to cluster the user's web service requests determine whether the requests in each cluster originated from a single device or multiple devices. For any cluster having requests from multiple devices, the provider will analyze the scheduling cookies associated with each request to determine how many devices submitted the requests in each cluster. The system will then store identified devices and their characteristics in a profile for the user. Then, when the user submits a new web service request, the web service provider can compare data in the request such as device parameters, user agent strings and/or cookies to identify the device from which the new request originated.

26 Claims, 6 Drawing Sheets

METHOD OF IDENTIFYING AN ELECTRONIC DEVICE BY BROWSER VERSIONS AND COOKIE SCHEDULING

BACKGROUND

Many web-based service providers may provide multiple functions to users. These functions may include cloud-based storage services, streaming media services, social media applications, mail and other messaging services, e-commerce applications and other services.

Just as a single provider may offer a user multiple services, a single user may use multiple devices to access the provider's services. For example, one person may own a smartphone, a desktop computer, a laptop and/or a tablet. That person will typically want to use each of those devices to access the services, depending on the context of use.

Web service providers often want to identify the devices that a person is using when accessing the provider's services. This is useful for various reasons, such as to help secure a user's account and data. This is because when a known device accesses an account, the service provider may permit a streamlined login process. However, when a previously-unrecognized device is used to access an account, the web service provider may ask for additional login information to help investigate whether the request signals suspicious activity. When a single user owns multiple similar devices (such as an older model and a newer model of the same brand of laptop or tablet computer), it may be difficult for the service to determine whether any particular device is known or unknown at the time of use.

This document describes methods and systems that may address issues such as those described above.

SUMMARY

In an embodiment, a provider of a web service identifies the devices from which a particular user submits web service requests by the request originated by receiving, from the registered user, a first group of requests to access one or more web service functions. In connection with each of the requests in the first group, the system will receive one or more data points about an electronic device from which the request originated, along with a user agent string that corresponds to a client application from which the request originated. The provider's system will analyze the data points and group the requests into clusters so that each cluster is made up of requests that originate from either a single electronic device or from a multiple electronic devices having similar properties. The system will then use the clusters to identify a set of devices that are used by the registered user. To do this, for each cluster, the provider may: (i) determine whether the cluster's requests originated from a single electronic device or from multiple electronic devices by analyzing the user agent strings to determine whether each request in the cluster may have originated from a single electronic device; (ii) generate a profile for the registered user so that the profile includes characteristics of each of the user's identified electronic device; and (iii) store the profile in a data store. If, for any cluster, the provider's analysis concluded that cluster's requests may have originated more than one electronic device, then for that cluster each request in that cluster, the provider may identify a scheduling cookie associated with the electronic device from which the request originated, determine a number of devices that could have used the scheduling cookies without any single device using at least two scheduling cookies of the same type at the same time, and include the determined number of devices in the profile.

When analyzing the user agent strings in a cluster to determine whether each request in the cluster can originate from a single electronic device, the provider may analyze a client application version identifier in each user agent string to determine whether the client application version identifiers show a regression to a prior version over time. If the client application version identifiers show a regression to a prior version over time, then the provider may determine that the cluster's requests originated from multiple electronic devices. Otherwise, the provider may conclude that the cluster's requests originated from a single electronic device.

Upon determining that any cluster's requests may have originated from multiple of electronic devices, then the system may, for each request in that cluster, identify a scheduling cookie associated with the electronic device from which the request originated. Each scheduling cookie will have an associated type and a time. The provider may then apply interval scheduling to the associated types and times of each scheduling cookie to determine a number of devices that could have used the scheduling cookies without any single device in the cluster using at least two scheduling cookies of the same type at the same time; and the provider may include the determined number of devices in the profile. Optionally, for each device in the determined number of devices, the provider may return a report of a web service function that corresponds to that device's request.

In some embodiments, the data points received about each electronic device may include any or all of the following: an operating system identifier; a client application version; or a screen resolution. When generating the profile, the provider may include the data points for each electronic device in the profile.

In some embodiments, the additional request includes one or more parameters of the requesting device. If so, the provider may use the parameters to match the electronic device from which the additional request originated with one of the electronic devices in the registered user's profile, identify one or more characteristics of the matched electronic device, and use the identified characteristics to select a parameter for one or more of the web service functions of the additional request. Then, when providing the web service functions of the additional request to the requesting device, the provider may deliver those web service functions with the selected parameter.

In some embodiments, when analyzing the additional request, if the analyzing does not conclude that the additional request originated from one of the electronic devices in the registered user's profile, then the provider may also cause a client application from which the additional request originated to generate a prompt to provide an additional authentication credential. In addition, the provider may only provide the additional request's web service functions to the requesting device after the web service receives the additional authentication credential.

In another embodiment, a provider of a web service processes a web service request and identifies a device from which the request originated by receiving, from a registered user of the web service, a first group of requests to access one or more web service functions. In connection each of the requests in the first group, the web service provider also receives one or more data points about an electronic device from which the request originated. The data points may include one or more characteristics of the requesting device such as an operating system identifier, a version for a client application that is installed on the device, a screen resolution and/or other parameters. The provider will analyze the data points and group the requests into clusters so that each cluster is made up of requests that originate from either a single electronic device or from a multiple electronic devices having one or more similar properties. The provider can then use the clusters to identify a set of devices that are used by the registered user by, for each cluster: (i) determining whether the cluster's requests originated from a single electronic device or from multiple electronic devices; (ii) generating a profile for the registered user so that the profile includes characteristics of the user's identified electronic devices; and (iii) storing the profile in a data store. Then, when the provider's system receives, from the requesting user via a requesting device, an additional request to access one of the more of the web service functions, the provider may analyze the additional request to determine whether the requesting device is one of the devices in the registered user's profile. If the provider determines that the requesting device is one of the electronic devices in the user's profile, it will provide the web service functions of the additional request to the requesting device.

To determine whether the cluster's requests originated from a single electronic device or from multiple electronic devices, then the system may analyze the clustered requests' user agent strings to determine whether each request in the cluster may have originated from a single electronic device. It may do this by analyzing a client application version identifier in each user agent string to determine whether the client application version identifiers show a regression to a prior version over time. If the client application version identifiers show a regression to a prior version over time, then the system may determine that the cluster's requests originated from multiple electronic devices. Otherwise the system may conclude that the cluster's requests originated from a single electronic device.

Upon determining that any cluster's requests may have originated from multiple of electronic devices, then for each request in that cluster the system may identify a scheduling cookie associated with the electronic device from which the request originated, wherein each scheduling cookie has an associated type. The system may then analyze associated types and times of each scheduling cookie to determine a number of devices that could have used the scheduling cookies without any single device in the cluster using at least two scheduling cookies of the same type at the same time. The system may include the determined number of devices in the profile. Optionally, for each device in the determined number of devices, the system also may include in the profile a web service function that corresponds to that device's request.

Optionally, when determining the number of devices that could have used the scheduling cookies without any single device using at least two scheduling cookies of the same type at the same time in the cluster, the system may, for each request in that cluster: analyze a persistent cookie and a non-persistent cookie; applying a first rule that that no single device may be associated with two different persistent cookies that overlap in time; and apply a second rule that no single device may be associated with two different non-persistent cookies at the same time.

DETAILED DESCRIPTION GLOSSARY

In this document, the following terms have the following meanings:

An "authentication application" is a set of programming instructions that, when executed by processor of an electronic device, authenticates the device to a web service. In the embodiments disclosed in this document, an authentication application includes a unique identifier that the web service can use to identify an account with which a user of the device is associated.

An "authentication credential" is a unique data element or set of data elements that a web service uses to validate a user to the service via one or more client applications on one or more electronic devices. A web service may require each user of the service to have a unique authentication credential, although in some service authentication credentials (or portions of authentication credentials) may be shared by two or more users, such as may be the case in a corporate job sharing arrangement, or an arrangement among family members. Examples of authentication credentials include passwords, username/password combinations, biometric credentials and the like.

A "client application" is a set of programming instructions that, when executed by processor of an electronic device, retrieves information from a web service and presents the retrieved information to a user of the electronic device. A browser is an example of a client application. Example types of information that a client application may retrieve include a web page, an electronic file, a streaming audio or video file, an image or other data.

A "client application version identifier" is a set of data, such as a string of alphanumeric characters, that will identify a version and/or revision of a client application. Examples include version numbers, revision numbers, and release dates.

"Comprising" means "including, but not limited to."

A "data store" is a set of one or more non-transitory, computer readable memories or memory sectors or portions on which computer-readable data is stored.

An "electronic device" is a device that includes a processor and non-transitory computer-readable memory. The memory contains programming instructions in the form of a software application that, when executed by the processor, causes the device to perform various operations according to the programming instructions. Examples of electronic devices include smartphones, personal digital assistants, cameras, tablet devices, electronic readers, personal computers, media players, satellite navigation devices and the like.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

A "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

A "scheduling cookie" is a small piece of data that an electronic device receives from a web service and stores while the device uses a client application uses the web service. After a web service session ends or is interrupted, then when the client application is again used to access the web service the client application may send the scheduling cookie to the web service so that the service can use the cookie to identify the device, the client application and/or the device or client application's previous activity.

A "user agent string" is a set of numbers or alphanumeric characters that a client application sends to a web service to identify the client application. A user agent string may include data representing an operating system, an application type, a software vendor, a version identifier or other identifying data.

A "web service" is a function or set of functions that can be accessed by an electronic device over a communications network (such as the World Wide Web) via a communications protocol such as hypertext transfer protocol. Examples of web services functions include, without limitation, e-commerce websites, streaming media services, social media applications, mail and other messaging services, cloud-based storage systems and other services. A "web service provider" is an entity that makes one or more web services available to registered users.

DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art.

Figure 1:
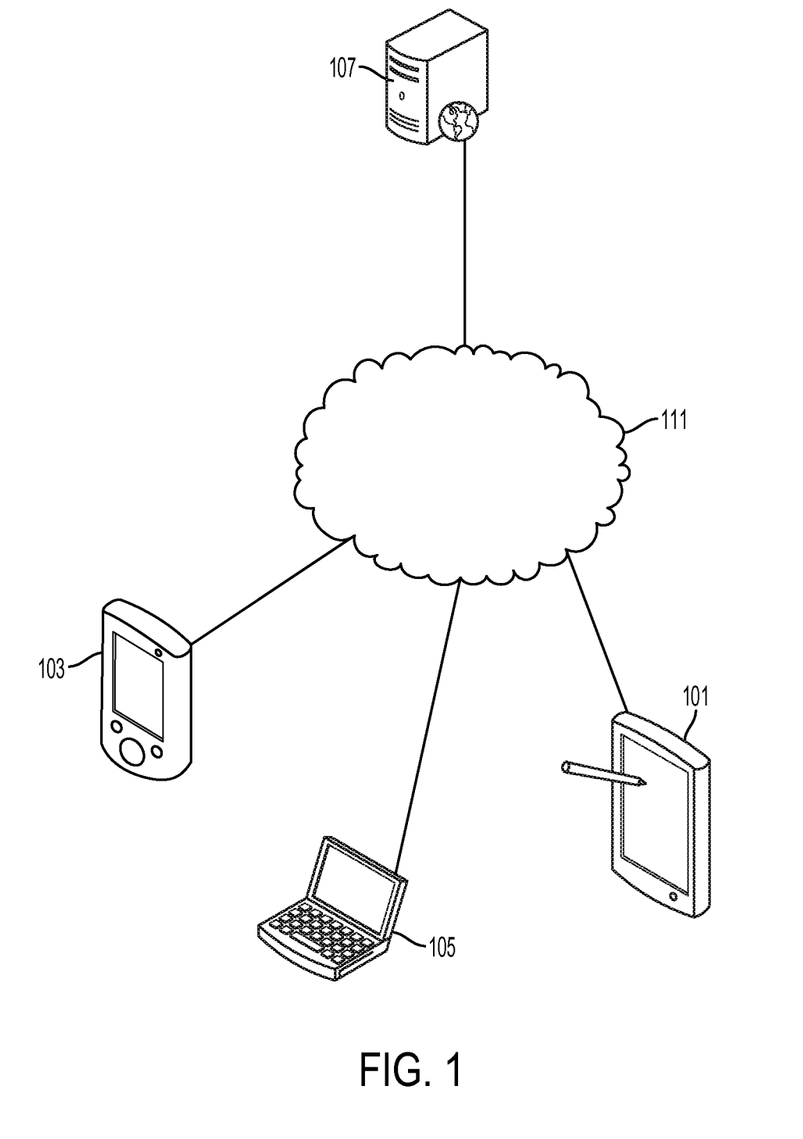
FIG. 1 shows several devices that may be used in the embodiments described in this document.

FIG. 1 shows several electronic devices that may be used in the context of the discussion below. Any number of user electronic devices 101, 103 and 105 will include communication components that enable each device to communicate with a remote web service provider electronic device 107 via one or more communication networks 111. As shown, the user electronic devices may include, for example, a smartphone 101; a laptop, desktop or notebook computer 103; a tablet computer 105; or any other type of electronic device on which one or more browsers or other client applications are installed. However, each component may be any suitable electronic device, such as those described in more detail below. It is only required that all electronic devices associated with a particular user have installed a common type of client application, such as a browser. The actual applications need not be identical, so long as they all the ability to store cookies and provide user agent strings as described below. For example, different devices may include different browser versions based on release date, operating system or device used, or other criteria.

The web service provider 107 also includes one or more electronic devices that make a web service accessible to the remote electronic devices. For example, the web service provider may host one or more web pages that are made available to remote user device. At least some of the web pages will be secure web pages having content that may only be accessed by an authorized user's device. The security of at least some of the pages may be implemented by encryption keys, passcodes or other authentication schemes. In addition, in some embodiments, the web service provider makes multiple web services available. Examples of multiple services may include a mail service, a social network and a file storage service. In such embodiments, when a device is authenticated to one of the available web services, the web service provider may automatically consider the device to authenticated to one or more of the additional services without requiring the device to provide any further authentication credentials or actions.

Figure 2:
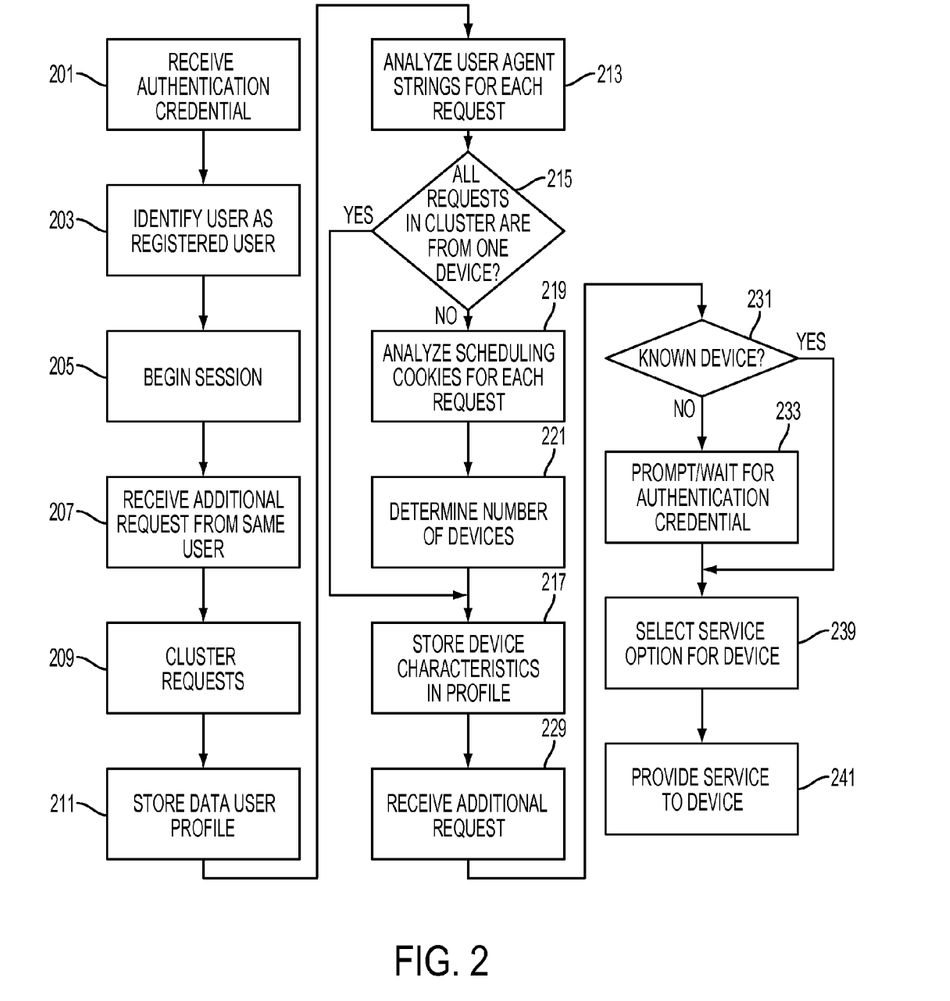
FIG. 2 is a flowchart illustrating steps that a web service provider may implement to identify the devices from which a particular user's web service requests are received.

FIG. 2 is a flowchart illustrating steps that a web service provider may implement to identify the electronic device from which a user's request originates. When a user first uses any electronic device's client application to access the web service, the web service provider may require the user to provide authentication credential. Once the user provides the authentication credential 201, the web service provider will compare the credential to a set of known credentials to determine if the user is a known user is a registered user of the web service. If the credential is known, then the web service provider will determine that the user is a registered user 203 and will begin a session 205 in which the client application can access one or more features of the web service.

Thereafter, when the web service provider receives an additional request from the same user to access the web service, the web service provider will also receive (in connection with the request) one or more data points about the device from which the request originated 207. The data points may include one or more general characteristics of the device such as an operating system type and/or version, a device model or a screen resolution of the device. The web service provider will analyze one or more of the data points for each request and group the requests into clusters 209 so that each cluster comprises requests that originate from either a single electronic device or from multiple electronic devices having similar characteristics. For example, the web service provider may cluster all requests that originated from devices having the same operating system, the same screen resolution, the same device model, other characteristics, or any combination of these characteristics.

The web service will store this information in a data store as a user profile 211, and it may use the clusters to identify one or more devices that the user typically uses. The web service provider may do this by, for each cluster, analyzing additional data points from each request in the cluster to assess whether the clustered requests may have originated according to more than one device.

For example, when the registered user uses a client application on any device to access the web service, the client application may have sent the web service provider a user agent string that corresponds to a client application from which the request originated. The web service provider may analyze the user agent strings for each request in the cluster 213 to determine 215 whether each request in the cluster can originate from a single electronic device. If so, then the web service provider assumes that all requests in the cluster originated from a single device and it stores characteristics of the device (and/or its client application) in the user profile 217.

The process of analyzing the user agent strings to determine whether each request in the cluster can originate from a single electronic device may rely on client application identifiers within each user agent string. A user agent string may include data that identifies the client application (for example, a browser type) and version that is being used. Whenever a client application is updated on a particular electronic device, the client application version identifier segment of the user agent string will be updated to include a higher version number. For example, whenever a browser is updated, the application version identifier segment of the browser's user agent string also may be updated. Once the browser is updated, it will not typically revert back to an older version. So, over time, one would expect the application version identifier to remain the same or increase, and not regress to a lower version number.

To take advantage of this, the web service provider may analyze a client application version identifier in each user agent string to determine whether the client application version identifiers show a regression to a prior version over time. If the client application version identifiers show a regression to a prior version over time, then the provider may determine that the cluster's requests may have originated from multiple electronic devices. Otherwise, the system may conclude that the cluster's requests likely originated from a single electronic device.

Figure 3:
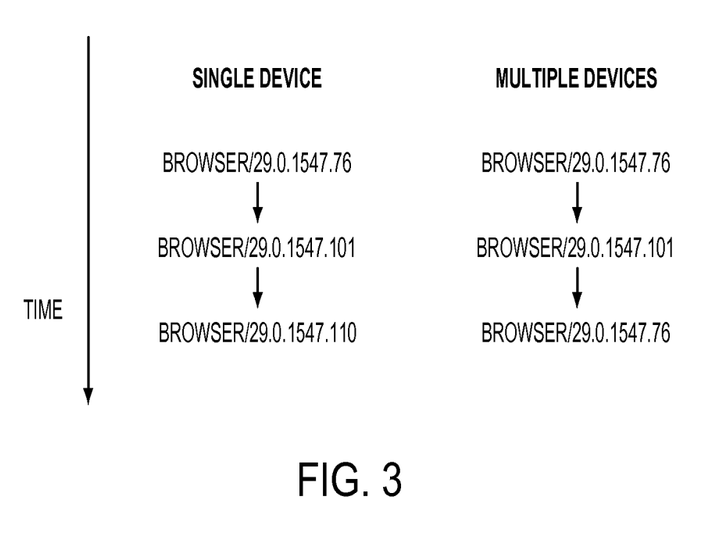
FIG. 3 illustrates how the embodiments below may use user agent strings to identify devices.

FIG. 3 provides a graphic illustration of this process. The left side of FIG. 3 shows a progression in which three user agent strings are received in sequence over a period of time. Each user agent string is associated with a particular browser, and the final digits (after the dot or period) in each string represents the version number of the browser. Here, the sequence 76, 101, 110 represents an increase over time, so the user agent strings may have been received from a single device. In contrast, the right side of FIG. 3 shows a progression in versions from 76 to 101, then a regression to version 76 over time. The system will conclude that the third user agent string cannot have originated from the same device that provided the first two user agent strings, since the third string shows a regression in the browser version number. Thus, a provider may conclude that the sequence on the left side of FIG. 3 required at least two devices.

If, after performing the process described above, the web service provider identifies that clustered requests shows a regression to a prior version, and therefore suspects that the requests originated from multiple devices, then it may perform that the requests originated from a single device. If so, then it may perform an additional level of analysis to determine whether the clustered requests originated from a single device. For example, the web service provider may analyze additional data points received with the requests—such as a scheduling cookie for each request—to determine how many different devices could be in the cluster 219. Each scheduling cookie will include data for a type (such as a browser type or other client application type), and will be associated with the times at which requests with the cookie were received. A particular client application will not contain two different scheduling cookies of the same type at the same time. Thus, the provider may use a suitable algorithm, such as interval scheduling, to determine a minimum number of devices that could have used the scheduling cookies for all requests in the cluster over a given period of time without any single device using at least two scheduling cookies of the same type at the same time in the cluster. The web service provider will return a report of the determined number of devices to include in the profile and it will save characteristics for each of the determined devices in the user's profile 217.

Figure 4:
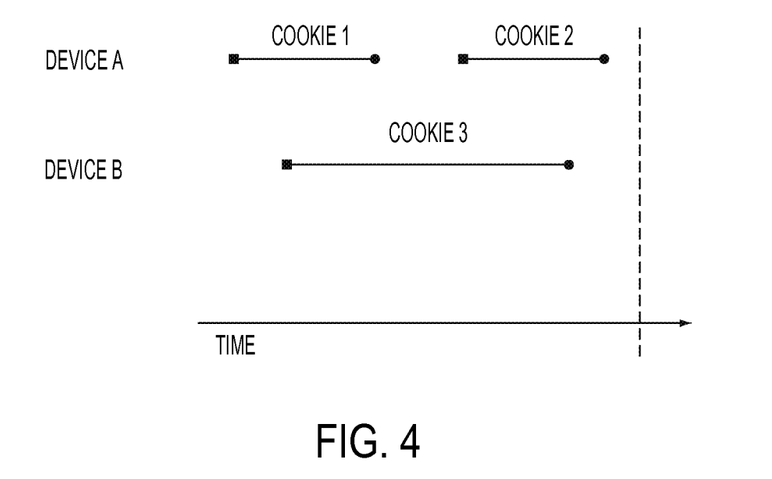
FIGS. 4 and 5 illustrate how the embodiments below may use scheduling cookies to identify devices.

FIG. 4 illustrates an example of how the system may use interval scheduling. In FIG. 4, the web service receives requests over a period of time. Three different scheduling cookies are received with the requests. Two of the cookies (Cookie 1 and Cookie 2) do not overlap in time, so they could originate from the same device, such as if a device experienced a browser update or cache-clearing event that replaced Cookie 1 with Cookie 2. Cookie 3 is received over a time period that overlaps the times of both Cookie 1 and Cookie 2. So, Cookie 3 could not have originated from the device that provided Cookie 1 or Cookie 2. In this situation, the minimum number of devices from which Cookies 1-3 may have originated is two.

Figure 5:
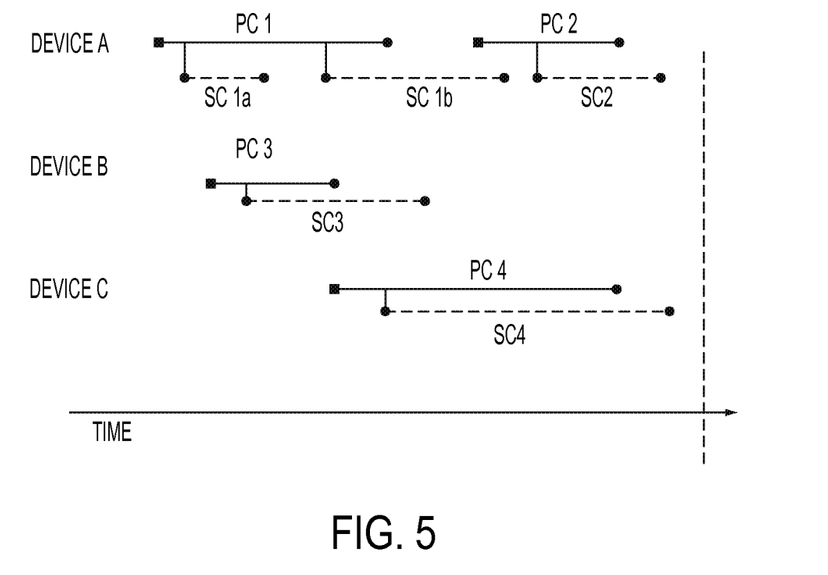

FIG. 5 illustrates an embodiment of how the system may use interval scheduling when both persistent cookies and non-persistent cookies are used. Persistent cookies are cookies that remain constant until a client application is updated. Non-persistent cookies are cookies that are changed each time that a client's web service session ends or is otherwise interrupted. In FIG. 5, interval scheduling shows that the persistent cookies (PC1, PC2, PC2 and PC4) must be associated with at least two electronic devices. (Note that PC3 and PC4 do not overlap, so they could result from a single device.)

The web service provider then uses time data associated with receipt of non-persistent cookies to determine which cookies should be strung together to evidence device activity from a single device over a time period. For example, FIG. 5 shows that over a first period of time the web service provider detected session cookies SC1a and SC1b coming from the device that was associated with persistent cookie PC1. The service also detected session cookies SC1a and SC2 coming from the device that was associated with persistent cookie PC2. Since session cookie SC2a overlapped in time with both PC1 and PC2 and also came from the device that submitted PC1 and PC2, the web service provider may conclude that persistent cookies PC1 and PC2 originated from a single device.

FIG. 5 also shows that if the persistent cookie data were analyzed on its own, persistent cookies PC3 and PC3 could have originated from a single device because they do not overlap in time. However, session cookie SC3 is associated with persistent cookie PC3, session cookie SC4 is associated with persistent cookie SC4, and session cookies SC3 and SC4 overlap. Because a single device cannot experience two sessions at the same time, the web service provider concludes that sessions SC3 and SC4 must be associated with two different devices.

When the web service provider receives an additional request from the registered user via a requesting device 229, the web service provider will determine whether the analyzed data points are sufficient to identify the requesting device as a known device for the requesting user 231. If the device is a known device, the web service provider will provide the requested function to the user's requesting device 241. If not, it will cause a client application from which the additional request originated to generate a prompt to provide an additional authentication credential 233; and it will only provide the additional request's web service functions to the requesting device after the web service provider receives the additional authentication credential.

As described above, a request will typically include one or more parameters of the requesting device. These may include, for example, a screen resolution, operating system version, or the like. The parameters also may include a user agent string or scheduling cookie. In some embodiments, the web service provider may compare these parameters to characteristics of devices in a registered user's profile to find a match and thus determine which of the electronic devices in the registered user's profile submitted the request. The system may then use the characteristics of the matched electronic device to select a parameter for the web service function 239. Then, when providing the web service functions of the additional request to the requesting device, the system will delivering the web service function with the selected parameter. For example, the system may use the screen resolution to deliver a photo sharing service with photos of a resolution that corresponds to the device's screen resolution.

Figure 6:
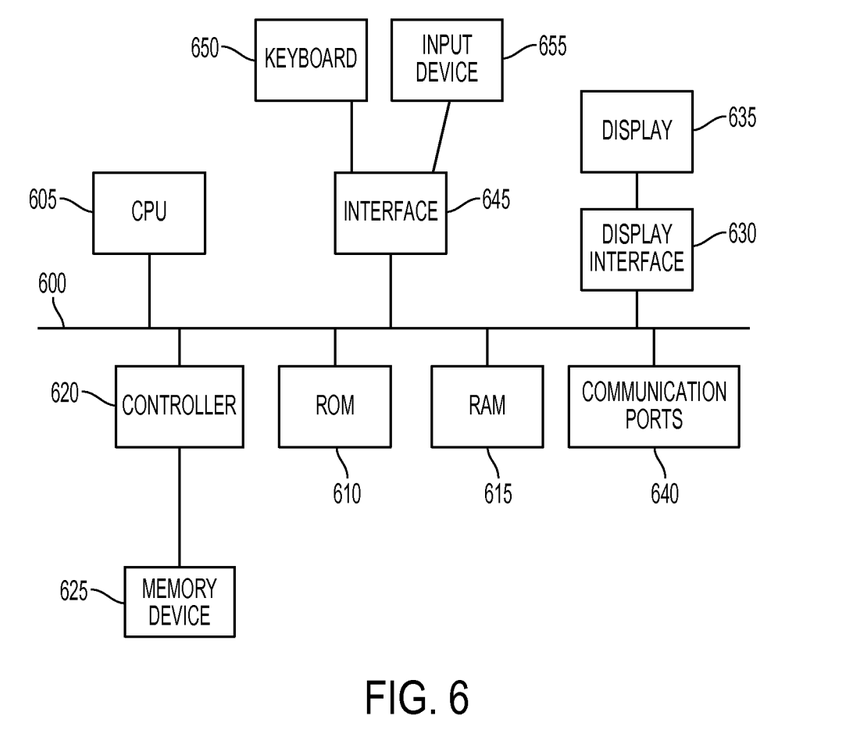
FIG. 6 is a block diagram illustrating various examples of electronic device components.

FIG. 6 is a block diagram showing various hardware components that may be part of a web service provider's electronic device or any user electronic device. For example, any of the devices shown in FIG. 1 may include similar internal hardware architecture such as that illustrated in FIG. 6. An electrical bus 600 serves as an information highway interconnecting the other illustrated components of the hardware. CPU 605 is a central processing unit of the system, performing calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute examples of memory devices.

A controller 620 interfaces with one or more optional memory devices 625 that service as data storage facilities to the system bus 600. These memory devices 625 may include, for example, an external DVD drive or CD ROM drive, a hard drive, flash memory, a USB drive or another type of device that serves as a data storage facility. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a non-transitory computer readable medium such as a compact disk, a digital disk, flash memory, a memory card, a USB drive, an optical disc storage medium, a distributed computer storage platform such as a cloud-based architecture, and/or other recording medium.

A display interface 630 may permit information from the bus 600 to be displayed on the display 635 in audio, visual, graphic or alphanumeric format. Communication with external devices may occur using various communication ports 640. A communication port 640 may be attached to a communications network, such as the Internet, a local area network or a cellular telephone data network.

The hardware may also include an interface 645 which allows for receipt of data from input devices such as a keyboard 650 or other input device 655 such as a touch screen, image sensor (such as a camera) and/or an audio input device.

The features and functions disclosed above, as well as alternatives, may be combined into other different systems or applications. Various presently unforeseen or unanticipated alternatives, modifications, variations or improvements may be made by those skilled in the art, each of which is also intended to be encompassed by the disclosed embodiments.

The invention claimed is:

1. A method of identifying a device that requests access to a web service, comprising, by one or more processors of a provider of the web service:
   receiving, from a registered user of the web service, a first group of requests to access one or more web service functions;
   receiving, in connection each of the requests in the first group, one or more data points about an electronic device from which the request originated;
   analyzing the data points and grouping the requests into a plurality of clusters so that each cluster comprises requests that originate from either a single electronic device or from a plurality of electronic devices having one or more similar properties;
   using the clusters to identify a set of devices that are used by the registered user by:
      for each cluster, determining whether the cluster's requests originated from a single electronic device or a plurality of electronic devices,
      generating a profile for the registered user so that the profile includes characteristics of the user's identified electronic devices, and
      storing the profile in a data store;
   receiving, from the requesting user via a requesting device, an additional request to access one of the more of the web service functions;
   analyzing the additional request to determine whether the requesting device is one of the devices in the registered user's profile;
   upon determining that the requesting device is one of the electronic devices in the user's profile, providing the web service functions of the additional request to the requesting device.

2. The method of claim 1:
   further comprising receiving, by the one or more processors of the web service provider in connection with each of the requests in the first group, a user agent string that corresponds to a client application from which the request originated; and
   wherein determining whether the cluster's requests originated from a single electronic device or a plurality of electronic devices comprises analyzing the user agent strings to determine whether each request in the cluster can originate from a single electronic device.

3. The method of claim 2, wherein, for any cluster, analyzing the user agent strings to determine whether each request in the cluster can originate from a single electronic device comprises:
   analyzing a client application version identifier in each user agent string to determine whether the client application version identifiers show a regression to a prior version over time; and
   if the client application version identifiers show a regression to a prior version over time then determining that the cluster's requests originated from a plurality of electronic devices, otherwise concluding that the cluster's requests originated from a single electronic device.

4. The method of claim 2, wherein upon determining that any cluster's requests may have originated from a plurality of electronic devices, then the method also comprises, for that cluster:
   for each request in that cluster, identifying a scheduling cookie associated with the electronic device from which the request originated, wherein each scheduling cookie has an associated type and a time;
   applying interval scheduling to the associated types and times of each scheduling cookie to determine a number of devices that could have used the scheduling cookies without any single device in the cluster using at least two scheduling cookies of the same type at the same time; and
   including the determined number of devices in the profile.

5. The method of claim 4, further comprising, for each device in the determined number of devices, returning a report of a web service function that corresponds to that device's request.

6. The method of claim 1, wherein:
   the one or more data points received about each electronic device comprise one of the following:

an operating system identifier,
a client application version, or
a screen resolution; and
generating the profile includes including the one or more data points for each electronic device in the profile.

7. The method of claim 1, wherein the additional request includes one or more parameters of the requesting device, and the method further comprises, by the one or more processors of the web service provider:
using the one or more parameters to match the electronic device from which the additional request originated with one of the electronic devices in the registered user's profile;
identifying one or more characteristics of the matched electronic device;
using the identified characteristics to select a parameter for one or more of the web service functions of the additional request; and
when providing the web service functions of the additional request to the requesting device, delivering those web service functions with the selected parameter.

8. The method of claim 1, wherein:
when analyzing the additional request, if the analyzing does not conclude that the additional request originated from one of the electronic devices in the registered user's profile, then the method also includes:
causing a client application from which the additional request originated to generate a prompt to provide an additional authentication credential; and
only providing the additional request's web service functions to the requesting device after the web service receives the additional authentication credential.

9. A web service provider system, comprising:
a processor; and
a computer-readable medium containing programming instructions configured to cause the processor to identify a device that requests access to a web service by:
receiving, from a registered user of the web service, a first group of requests to access one or more web service functions;
receiving, in connection each of the requests in the first group, one or more data points about an electronic device from which the request originated;
analyzing the data points and grouping the requests into a plurality of clusters so that each cluster comprises requests that originate from either a single electronic device or from a plurality of electronic devices having one or more similar properties;
using the clusters to identify a set of devices that are used by the registered user by:
for each cluster, determining whether the cluster's requests originated from a single electronic device or a plurality of electronic devices,
generating a profile for the registered user so that the profile includes characteristics of the user's identified electronic devices, and
storing the profile in a data store;
receiving, from the requesting user via a requesting device, an additional request to access one of the more of the web service functions;
analyzing the additional request to determine whether the requesting device is one of the devices in the registered user's profile;
upon determining that the requesting device is one of the electronic devices in the user's profile, providing the web service functions of the additional request to the requesting device.

10. The system of claim 9, further comprising additional programming instructions configured to cause the processor to:
receive, in connection with each of the requests in the first group, a user agent string that corresponds to a client application from which the request originated; and
when determining whether the cluster's requests originated from a single electronic device or a plurality of electronic devices, analyze the user agent strings to determine whether each request in the cluster can originate from a single electronic device.

11. The system of claim 10, wherein, for any cluster, the instructions to analyze the user agent strings to determine whether each request in the cluster can originate from a single electronic device comprise instructions to:
analyze a client application version identifier in each user agent string to determine whether the client application version identifiers show a regression to a prior version over time; and
if the client application version identifiers show a regression to a prior version over time then determine that the cluster's requests originated from a plurality of electronic devices, otherwise conclude that the cluster's requests originated from a single electronic device.

12. The system of claim 10, further comprising instructions to, upon determining that any cluster's requests may have originated from a plurality of electronic devices, then:
for each request in that cluster, identify a scheduling cookie associated with the electronic device from which the request originated, wherein each scheduling cookie has an associated type and a time;
apply interval scheduling to the associated types and times of each scheduling cookie to determine a number of devices that could have used the scheduling cookies without any single device in the cluster using at least two scheduling cookies of the same type at the same time; and
include the determined number of devices in the profile.

13. The system of claim 12, further comprising additional programming instructions configured to cause the processor to, for each device in the determined number of devices, return a report of a web service function that corresponds to that device's request.

14. The system of claim 9, further comprising additional instructions to, when generating the profile, including one or more of the following data points for each electronic device in the profile:
an operating system identifier,
a client application version, or
a screen resolution.

15. The system of claim 9, further comprising additional programming instructions configured to cause the processor to:
identify, from the request, one or more parameters of the requesting device and use the identified one or more parameters to match the electronic device from which the additional request originated with one of the electronic devices in the registered user's profile;
identify one or more characteristics of the matched electronic device;
use the identified characteristics to select a parameter for one or more of the web service functions of the additional request; and
when providing the web service functions of the additional request to the requesting device, deliver those web service functions with the selected parameter.

16. The system of claim 9, further comprising additional programming instructions configured to cause the processor to:

when analyzing the additional request, if the analyzing does not conclude that the additional request originated from one of the electronic devices in the registered user's profile, then also:

cause a client application from which the additional request originated to generate a prompt to provide an additional authentication credential; and only provide the additional request's web service functions to the requesting device after the web service receives the additional authentication credential.

17. A method of identifying a group of devices that correspond to a registered of a web service, comprising, by one or more processors of a provider of the web service:

receiving, from a registered user of the web service, a first group of requests to access one or more web service functions;

receiving, in connection each of the requests in the first group:

one or more data points about an electronic device from which the request originated, and a user agent string that corresponds to a client application from which the request originated;

analyzing the data points and grouping the requests into a plurality of clusters so that each cluster comprises requests that originate from either a single electronic device or from a plurality of single electronic devices having one or more similar properties;

using the clusters to identify a set of devices that are used by the registered user by:

for each cluster, determining whether the cluster's requests originated from a single electronic device or a plurality of electronic devices by analyzing the user agent strings to determine whether each request in the cluster may have originated from a single electronic device, generating a profile for the registered user so that the profile includes characteristics of each of the user's identified electronic devices, and storing the profile in a data store.

18. The method of claim 17, wherein, for any cluster, analyzing the user agent strings to determine whether each request in the cluster may have originated from a single electronic device comprises:

analyzing a client application version identifier in each user agent string to determine whether the client application version identifiers show a regression to a prior version over time; and if the client application version identifiers show a regression to a prior version over time then determining that the cluster's requests originated from a plurality of electronic devices, otherwise concluding that the cluster's requests originated from a single electronic device.

19. The method of claim 17, wherein upon determining that any cluster's requests may have originated from a plurality of electronic devices, then the method also comprises, for that cluster:

for each request in that cluster, identifying a scheduling cookie associated with the electronic device from which the request originated, wherein each scheduling cookie has an associated type and a time;

analyzing the associated types and times of each scheduling cookie to determine a number of devices that could have used the scheduling cookies without any single device in the cluster using at least two scheduling cookies of the same type at the same time; and including the determined number of devices in the profile.

20. The method of claim 19, further comprising, for each device in the determined number of devices, including in the profile a web service function that corresponds to that device's request.

21. The method of claim 19, wherein determining the number of devices that could have used the scheduling cookies without any single device using at least two scheduling cookies of the same type at the same time in the cluster comprises:

for each request in that cluster, analyzing a persistent cookie and a non-persistent cookie;

applying a first rule that that no single device may be associated with two different persistent cookies that overlap in time; and applying a second rule that no single device may be associated with two different non-persistent cookies at the same time.

22. A web service provider system, comprising:

a processor; and a computer-readable medium containing programming instructions configured to cause the processor to identify a device that requests access to a web service by:

receiving, from a registered user of the web service, a first group of requests to access one or more web service functions;

receiving, in connection each of the requests in the first group:

one or more data points about an electronic device from which the request originated, and a user agent string that corresponds to a client application from which the request originated;

analyzing the data points and grouping the requests into a plurality of clusters so that each cluster comprises requests that originate from either a single electronic device or from a plurality of single electronic devices having one or more similar properties;

using the clusters to identify a set of devices that are used by the registered user by:

for each cluster, determining whether the cluster's requests originated from a single electronic device or a plurality of electronic devices by analyzing the user agent strings to determine whether each request in the cluster may have originated from a single electronic device, generating a profile for the registered user so that the profile includes characteristics of each of the user's identified electronic devices, and storing the profile in a data store.

23. The system of claim 22, wherein the instructions to analyze the user agent strings for any cluster to determine whether each request in the cluster may have originated from a single electronic device comprise instructions to:

analyze a client application version identifier in each user agent string to determine whether the client application version identifiers show a regression to a prior version over time; and if the client application version identifiers show a regression to a prior version over time then determine that the cluster's requests originated from a plurality of electronic devices, otherwise conclude that the cluster's requests originated from a single electronic device.

24. The system of claim 22, further comprising additional instructions to, upon determining that any cluster's requests may have originated from a plurality of electronic devices, then also causing the processor to:

for each request in that cluster, identify a scheduling cookie associated with the electronic device from which the request originated, wherein each scheduling cookie has an associated type and a time;

analyze the associated types and times of each scheduling cookie to determine a number of devices that could have used the scheduling cookies without any single device in the cluster using at least two scheduling cookies of the same type at the same time; and include the determined number of devices in the profile.

25. The system of claim 24, further comprising additional instructions to, for each device in the determined number of devices, include in the profile a web service function that corresponds to that device's request.

26. The system of claim 24, wherein the instructions to determine the number of devices that could have used the scheduling cookies without any single device using at least two scheduling cookies of the same type at the same time in the cluster comprise instructions to:

for each request in that cluster, analyze a persistent cookie and a non-persistent cookie;

apply a first rule that that no single device may be associated with two different persistent cookies that overlap in time; and apply a second rule that no single device may be associated with two different non-persistent cookies at the same time.

* * * * *